United States Patent Office 3,478,445
Patented Nov. 18, 1969

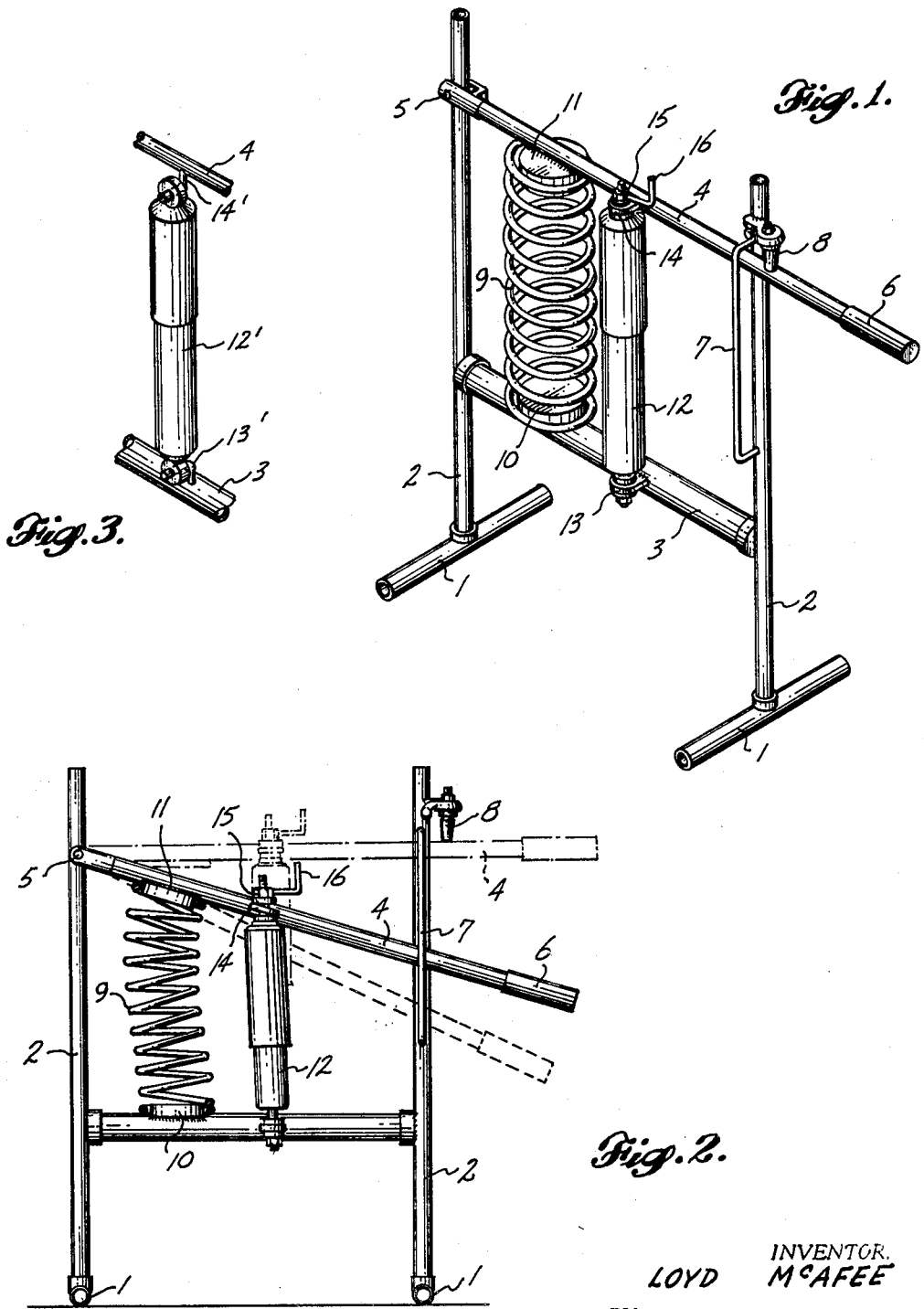

3,478,445
SHOCK ABSORBER PERFORMANCE
DEMONSTRATION STAND
Loyd McAfee, Seattle, Wash., assignor to Monroe Auto
Equipment Company, Monroe, Mich.
Filed Nov. 23, 1966, Ser. No. 596,564
Int. Cl. G09b 25/00; G01m 17/04
U.S. Cl. 35—49                                    4 Claims

ABSTRACT OF THE DISCLOSURE

A shock absorber demonstration stand comprising a frame and a movable lever arm and a spring, the frame adapted to support a shock absorber, the shock absorber being compressed upon preselected movement of the lever arm so as to demonstrate the operation of the shock absorber.

---

This invention relates to a demonstration stand for demonstrating the effectiveness and performance of shock absorbers of the barrel type which are customarily used for automotive purposes.

The purpose of an automobile shock absorber is to snub the action of suspension springing for an automobile so that the rebound, in particular, of a wheel after it passes over a bump will be damped. In other words, the shock absorber provides a dashpot action if it is in good operating condition. It is desirable to be able to demonstrate to a prospective customer the manner in which a shock absorber performs and the difference in the performance between a shock absorber which is in good condition and one which is quite worn.

It is the principal object of the present invention to provide a demonstration stand which will simulate the actual operation of a shock absorber so that it can be seen readily by a prospective customer. In simulating the operation of the shock absorber it is an object to portray graphically the difference in operation between a shock absorber in good condition and one which is in poor condition by reference to the speed of movement and smoothness of operation of the shock absorber action.

A further object is to enable the performance of a shock absorber in good condition, and the performance of a shock absorber in poor condition, to be compared directly and either sequentially or simultaneously, as may be preferred.

In providing a device for demonstrating the performance of a shock absorber it is an object for such a device to be simple and easy to operate and to be operable by a potential customer himself with little or no physical danger to him, even when the demonstration device is not attended by a person familiar with shock absorbers and the demonstration device.

Another object is to provide a demonstration stand for shock absorbers which is adapted to accommodate or can be adjusted to accommodate actuating springs and/or shock absorbers of different sizes and capacities. An incidental object is to enable one shock absorber to be substituted for another shock absorber on the demonstration stand quickly and easily.

It is also an object to provide a shock absorber demonstration stand which is of simple, although effective, construction and is light in weight and compact, while being rugged and stable. Further, it is preferred that the stand be readily demountable so that it can be packed for shipment or storage in a small space.

The foregoing objects can be accomplished by providing a shock absorber performance demonstration stand composed of a frame which can be stably supported upon the ground and on which can be mounted a spring actuated member, movement of which can be damped by a shock absorber. Specifically it is preferred that such member be a lever arm pivoted on the stand with which is engaged a spring for moving the member in one direction and a shock absorber connected to retard movement of such member under the force of such spring. Such member preferably is a lever which can be swung manually in opposition to the force of the spring and then released for movement by the spring under the control of the shock absorber which retards such spring-urged movement of the lever.

FIGURE 1 is a top perspective of a representative shock absorber performance demonstration stand, and FIGURE 2 is a side elevation of such stand. FIGURE 3 is a top perspective of the shock absorber mounting portion of the stand, showing an alternate form of supporting or connecting means for the shock absorber.

An automobile shock absorber is installed on an automobile in conjunction with a spring for the purpose of modifying the action of the spring, both during its movement under a sudden load applied to an automobile wheel and during opposite movement of the spring pressed member to its initial condition. Frequently the spring is of the helical compression type and the shock absorber is of the barrel type composed of telescoping members which provide a dashpot action to modify the spring movement. In providing the performance demonstration stand of the present invention for shock absorbers the usual relationship and environment of a typical compression spring and shock absorber combination has been employed. These elements have been mounted in relationship generally comparable to that which these elements occupy in an automobile, yet are positioned so that a prospective shock absorber customer can observe the performance of the spring and shock absorber readily during the demonstration and can actually manipulate the device himself to operate the spring and shock absorber.

The demonstration stand, as shown in FIGURES 1 and 2, includes a frame for mounting the spring and shock absorber preferably in adjacent relationship with their lengths upright. Such a stand may be supported stably on the ground by ground-engaging means such as parallel crossbars 1, the lengths of which extend transversely of the plane of the upright frame composed of two upright posts 2 arranged in spaced relationship and connected by the generally horizontal mounting rail 3. The lower end of each post 2 may fit into a socket on the upper side of a crossbar, which socket is sufficiently deep so that, if desired, the lower end of the post need not be fastened into the socket. Alternatively, the lower end of each post can be fastened to its ground-engaging crossbar 1 by quickly disengageable means such as a detent or by more permanent means such as a pin or a bolt, or the lower end of the post can even be welded to the socket of the ground-engaging member.

The mounting rail 3 can be connected to the posts 2 either demountably or permanently so that such mounting rail and the two posts together form a substantially planar frame structure. Opposite ends of such mounting rail can be received in sockets carried by the respective posts and the ends of such mounting rail can be secured in such sockets removably by pins or bolts, or permanently by being welded in suuh sockets. A lever 4 is located above such mounting rail and disposed in substantially parallel relation to it. One end of this lever is bifurcated to embrace a post 2 and such lever and the post are connected by a pivot pin 5 guiding the lever for swinging in an upright plane. A portion of such lever remote from the pivot 5 extends alongside the other post 2 and the lever projects beyond such post to provide a handle portion 6.

Preferably the swinging portion of the lever is guided for elevational movement by a guide bar 7 secured to such other post and extending parallel to it in a relationship spaced far enough from it to receive the lever between such guide and the post. Such lever may swing between the upper and lower portions of the guide 7 which are connected to the post. It is preferred that upward movement of the lever be limited by its engagement with a bumper 8 mounted on the upper portion of the post adjacent to the upper end of guide 7. Such bumper is engageable by the lever before it reaches the upper end of the guide bar 7.

The spring, analogous to an automobile suspension spring and the shock absorber which snubs the spring action are mounted in combination so that downward movement of the lever 4 will stress the spring and when the lever handle 6 is released the spring will return the lever 4 to its upper limiting position under control of the shock absorber. It is desirable to mount the spring and shock absorber in adjacent relationship so that the action of both can be observed easily and they will be generally in the relationship in which they are arranged in an actual automobile installation. In FIGURES 1 and 2 the helical compression spring 9 is shown as being mounted between the mounting rail 3 and the lever 4. The lower end of the spring is secured to such mounting rail by a spring perch 10 and the upper end of the spring is secured to the underside of the lever 4 by a spring perch 11.

The barrel type shock absorber 12 preferably is mounted approximately midway between the posts 2 in an upright position generally parallel to the spring 9 and disposed transversely of the length of lever 4. The structure for mounting the shock absorber in this position should enable the shock absorber to be installed quickly and easily between the mounting rail 3 and the lever 4. For this purpose a bracket 13 may be provided on the mounting rail, such as being welded to one side of it. This bracket is apertured to receive the mounting bolt in the lower end of the shock absorber. From the lever 4 a corresponding bracket 14 projects and it is apertured to receive the mounting bolt on the upper end of the shock absorber. The shock absorber is then secured in place by a nut 15 screwed onto the bolt in the upper end of the shock absorber and tightening of this nut is facilitated by providing a crank 16 projecting from one side of it.

Since both the spring 9 and the shock absorber 12 are engaged between the stationary mounting rail 3 and the lever 4, downward swinging of such lever from the upper position shown in full lines in FIGURE 1, and in broken lines in FIGURE 2, into the lower broken line position of FIGURE 2 will simultaneously compress the spring 9 and contract the shock absorber. If the handle 6 is then released suddenly the spring 9 will tend to swing the lever 4 upward again quickly into its limiting position. Since the shock absorber 12 must expand conjointly with the expansion of spring 9, the rate of return movement of the lever which is effected by the force produced by the compressed spring 9 will be regulated by the resistance to movement of the lever produced by the shock absorber. If the shock absorber is in good condition the movement of the lever produced by the spring will be smooth and at a substantially uniform rate which is much slower than would be the case if the lever were swung by the force of spring 9 without the controlling action of the shock absorber 12.

On the other hand, if the shock absorber 12 is not in good condition it will have less effect in snubbing the movement of the lever 4 under the action of spring 9. Consequently, the spring can fling the lever upward so that it will strike the bumper 8 relatively forcibly and may rebound somewhat from the bumper to cause a clatter. The movement of the lever will be relatively violent if the shock absorber 12 is in poor condition over the action which will occur if the shock absorber is in good condition. The violence of movement of the lever arm will, of course, be governed not only by the effectiveness of the shock absorber but also by the extent to which the lever is displaced downward before it is released.

The shock absorber 12, shown in FIGURES 1 and 2, is of the type having axially extending mounting studs mounted on its opposite ends, but some shock absorbers have eyes disposed in axial planes with holes in them extending transversely of the length of said shock absorber. Such a shock absorber 12' is shown in FIGURE 3. In order to be able to mount such a shock absorber conveniently the mounting rail 3 has an angle hook 13', the free end of which can be engaged in one shock absorber eye. The lever 4 carries a corresponding angle hook 14' projecting downwardly from it, the free end of which can be inserted into the upper eye of the shock absorber. It probably is unnecessary to secure such a shock absorber to the hooks but, if desired, their free ends can be threaded to receive nuts which will lock the shock absorber eyes to the hooks. The shock absorber of such an installation will operate in the same manner as described for the shock absorber 12 of FIGURES 1 and 2.

The shock absorber performance demonstration stand shown in FIGURES 1, 2 and 3 is composed of cylindrical tubes. Bars of other structural shapes can, if desired, be substituted for such tubes.

I claim as my invention:

1. A shock absorber performance demonstration stand comprising a frame including two upright posts disposed in spaced relationship and a mounting rail connecting said posts, a lever arm above said mounting rail, pivot means pivotally connecting said lever arm to one of said posts and said lever arm extending from such post alongside and projecting beyond the other post, spring means engaged between said mounting rail and said lever arm and urging said lever arm upward, stop means carried by said other post and engageable by said lever arm in its uppermost position to limit upward movement thereof, and a barrel type of rebound-snubbing shock absorber engaged between said mounting rail and said lever arm for snubbing the upward movement of said lever arm effected by said spring means.

2. The shock absorber performance demonstration stand defined in claim 1, in which the spring means are located between the pivot means and the shock absorber.

3. The shock absorber performance demonstration stand defined in claim 2, in which the shock absorber is located approximately centrally between the posts.

4. A shock absorber performance demonstration stand comprising a frame including ground-engaging base means, two upright posts upstanding from said base means in spaced relationship and a mounting rail connecting said posts, a lever arm above said mounting rail, pivot means pivotally connecting said lever arm to one of said posts and said lever arm extending from such post alongside and projecting beyond the other post, guide means carried by said other post and guiding said lever arm for elevational movement relative thereto swinging about said pivot means, spring means engaged between said mounting rail and said lever arm and urging said lever arm upward, stop means carried by said other post engageable by said lever arm in its uppermost position to limit upward movement thereof, and a barrel type of rebound-snubbing shock absorber engaged between said mounting rail and said lever arm for snubbing the upward movement of said lever arm effected by said spring means.

References Cited

UNITED STATES PATENTS

| 1,627,125 | 5/1927 | Stuart | 35—50 |
| 2,746,764 | 5/1956 | Davis | 280—124 |
| 2,989,133 | 6/1961 | Hodkin | 280—124 X |

FOREIGN PATENTS 1,013,094  8/1957  Germany.

EUGENE R. CAPOZIO, Primary Examiner
HARLAND S. SKOGQUIST, Assistant Examiner

U.S. Cl. X.R.

73—11